United States Patent [19]

Fava et al.

[11] 4,303,784

[45] * Dec. 1, 1981

[54] PRODUCTION OF POLYSTYRENE REFLECTOR BEADS

[75] Inventors: Ronald A. Fava, Monroeville; Clarence E. Chaney, Verona, both of Pa.

[73] Assignee: ARCO Polymers, Inc., Philadelphia, Pa.

[*] Notice: The portion of the term of this patent subsequent to Dec. 1, 1998, has been disclaimed.

[21] Appl. No.: 146,924

[22] Filed: May 5, 1980

[51] Int. Cl.$^3$ .............................................. C08F 6/24
[52] U.S. Cl. .................................. 528/488; 521/56; 521/60; 526/346; 528/489
[58] Field of Search ............. 521/56, 60; 526/346; 528/488, 489, 490

[56] References Cited

U.S. PATENT DOCUMENTS

| | | | |
|---|---|---|---|
| 2,715,118 | 8/1955 | Grimm | 526/346 |
| 3,207,712 | 9/1965 | Andrews et al. | 526/346 |
| 3,222,343 | 12/1965 | Ingram | 526/346 |
| 3,280,089 | 10/1966 | Wright | 526/346 |
| 3,389,097 | 6/1968 | Ingram et al. | 526/346 |
| 3,425,966 | 2/1969 | Ronden et al. | 526/346 |
| 3,442,881 | 5/1969 | Jahn et al. | 526/346 |
| 3,470,146 | 9/1969 | MacFay | 526/346 |
| 3,503,908 | 3/1970 | Wright et al. | 526/346 |
| 3,520,833 | 7/1970 | Wright | 526/346 |
| 3,526,605 | 9/1970 | Ingram | 526/346 |
| 3,647,723 | 3/1972 | Mysik | 526/346 |
| 4,129,706 | 12/1978 | Keppler et al. | 526/346 |

*Primary Examiner*—Morton Foelak
*Attorney, Agent, or Firm*—John R. Ewbank

[57] ABSTRACT

Many reflector beads have been made from plastics more costly then polystyrene. By the present invention, water white, crystal clear polystyrene beads are prepared from styrene by polymerization in an aqueous solution having a concentration of from about 2.5 to about 6 molar inorganic solute, at conditions corresponding to production of uniformly sized polystyrene beads of the type ordinarily used as precursor for expandable polystyrene beads. The thus produced beads are rinsed with water and then dried to provide reflector beads.

1 Claim, No Drawings

PRODUCTION OF POLYSTYRENE REFLECTOR BEADS

RELATED INVENTIONS

Reference is made to the application of Ronald A. Fava et al, Docket 79S8, Ser. No. 146,923 filed May 5, 1980 concerning PRODUCTION OF REFLECTOR BEADS FROM PRECURSOR BEADS FOR EXPANDABLE POLYSTYRENE, all the disclosure of said application being deemed here reiterated and incorporated herein.

FIELD OF INVENTION

This invention relates to production of small polystyrene beads so that they are crystal clear instead of cloudy.

PRIOR ART

Heretofore reflector plastic beads have been made from a variety of plastics by a variety of methods. Such approaches for forming crystal clear spheroids useful as reflector beads generally require specialized factories so that occasional production of clear beads has generally not been deemed an appropriate business practice. The demand for clear beads has been expanding by reason of the usefulness of small clear beads as reflectors in signs, movie screens and the like.

By polymerization of a dispersion in an aqueous system of monomeric styrene, prior technologists have manufactured precursor beads suitable as an intermediate product for the production of expandable polystyrene beads. Such precursor beads comprise cloudy beads, thus making them unsuitable for use as reflector beads.

During the production of beads which are precursors for expandable beads, some batches comprise beads which do not meet specifications. Although such off-specification beads have utility as scrap for molding operations, there has not been any appropriate market for such beads which utilizes their spherical shape. There has been a long standing demand for methods for preparing crystal clear polystyrene beads instead of cloudy beads by methods resembling those used in making precursor beads.

SUMMARY OF THE INVENTION

In accordance with the present invention, monomeric styrene is polymerized at least in part in an aqueous system containing an inorganic solute in a concentration of at a least about 2.5 molar but not more than about 6 molar and such dispersion is subjected to the pressure, temperature, and agitation for polymerizing the dispersion into a dispersion of unformily sized polystyrene beads. The dispersion of beads is then cooled. The thus-produced beads are washed and dried and provide reflector beads useful for many decorative purposes by reason of the combination of their transparency, spherical shape, and polystyrene composition.

DETAILED DESCRIPTION

The invention is further clarified by reference to a plurality of examples.

Control Example A

A batch of polystyrene beads having an average diameter of 1/32 of an inch was prepared following the general procedure shown for Example IV of Grim 2,673,194. A solution of 0.008 part of sodium oleate was dissolved in 40 parts of distilled water to which was added 0.5 parts of hydroxy apatite having a particle size of reasonably uniform nature and of the order of 0.03 to 0.06 micron. The combination of the organic dispersing agent, that is, sodium oleate, and the inorganic submicron particle, that is, the hydroxy apatite, is important in the suspension polymerization for achieving the beads of reasonably uniform size. The aqueous suspension of hydroxy apatite was modified by the addition of 60 parts of styrene containing 0.105 parts of benzylperoxide, corresponding to 0.175% of the benzylperoxide catalyst in the styrene. This mixture was agitated in a flask provided with an axial impeller-type agitator and suspended swirl baffles to form a suspension. The suspension thus formed was heated at 90° C. with continued agitation in a nitrogen atmosphere for 20 hours. The styrene polymerized to provide a suspension of polystyrene beads. The reaction mixture was allowed to cool. The pH of the dispersion medium, which was 5.6 at the finish of the polymerization, was changed to pH 2 by the addition of concentrated hydrochloric acid. The thus cooled and acidified suspension of polystyrene beads in water was centrifuged to separate the polystyrene beads, which were washed with water at ambient temperature and dried. The beads, which had an average diameter of about 1/32 inch, had a molecular weight of about 228,000. Appropriate tests were conducted by molding the beads.

At the elevated temperature, the polymer tends to trap tiny micelles of water in some of the beads. Such water is volatilized from the bead during the drying step, thus providing tiny air cells near the bead surface. Such air cells are believed to impart cloudiness to the appearance of such beads.

Partly because of the method of manufacture, some of the beads have a cloudy appearance which limits their utility but does not impair their effectiveness for production of expandable beads and/or for the molding of articles using such beads in lieu of conventional molding pellets. However, the cloudiness does impair the usefulness of the uniformly sized beads for many of the purposes for which clear transparent beads are used. Thus, in making of signs or in the making of reflecting screens for movie screens or the like, the beads should be crystal clear and water white.

EXAMPLE 1

An aqueous solution containing 2.5 molar (about 23% by weight) calcium chloride is prepared and employed instead of distilled water in the preparation of a dispersion of polystyrene beads in accordance with Example A. The thus prepared dispersion of beads is then allowed to cool and the beads are separated from the brine. The thus separated beads are rinsed to remove the traces of brine and then dried. The resulting beads are crystal clear and water white and suitable for use as reflector beads for decorative purposes.

During polymerization, small micelles of water tend to be distributed adjacent the surface of the polystyrene bead. However, if instead of distilled water, the suspending medium is a brine having a molar concentration within a range from about 2.5 to about 6 molar therein, the salt solution by an osmotic effect prevents the absorption of water into the bead. Because the polystyrene beads prepared in brine lack the cloudiness of the precursor beads, they are useful as reflector beads.

EXAMPLE 2

A series of batches of beads are manufactured as described in Example 1. The beads are subjected to a size separation, so that only the beads of the desired size are advanced toward the zone for the impregnation of the blowing agent. The off-size beads are segregated and marketed for reflector beads by reason of their freedom from cloudiness.

EXAMPLE 3

Styrene is polymerized to form a dispersion of polystyrene beads by the method resembling Example 1 excepting that a 6 molar solution (about 20% weight) of sodium hydroxide is employed in lieu of calcium chloride brine. After cooling and drainage of the alkaline solution from the thus prepared beads and the washing and the drying of the beads, they are crystal clear and water white and suitable for use for decorative purposes.

EXAMPLE 4

By a series of tests it is established that the concentration of the ionized inorganic solute in the aqueous system must be at least about 2.5 molar and not more than about 6 molar, that the polymerization at de-clouding conditions must be conducted at a temperature within a range from about 85° C. to about 140° C. for a period from about 2 to about 20 hours, followed by water rinsing and drying to produce crystal clear reflector beads.

EXAMPLE 5

Reflector beads are prepared from monomeric styrene by suspension polymerization using about a 4 molar solution of inorganic solute. Sodium chloride, potassium iodide, sodium nitrate, magnesium chloride, sodium hydroxide, calcium chloride, and appropriate mixtures thereof, are shown to be effective inorganic solutes for invention. After the brine treatment, the beads are drained, washed, and dried. On the basis of the good results obtained with such a variety of solutes, it was concluded that similar water soluble inorganic solutes could be effective.

EXAMPLE 6

Styrene, together with a combination of catalytic initiators corresponding to 0.35% benzoyl peroxide and 0.05% tertiary butyl perbenzoate was dispersed in an aqueous system containing a dispersion of submicron particles of apatite, and the mixture was stirred during the pressurized heating adapted to polymerize the styrene to a dispersion of polystyrene beads. In one set of preparation, the polymerization was conducted for 7 hours at 90° C. followed by 90 minutes at 135° C. Such beads contained troublesome amounts of cloudy beads when the aqueous system was water or an aqueous solution of sodium chloride at a concentration of 5% or 10% by weight, corresponding to about 1 and 1.7 molar sodium chloride. However, by increasing the brine concentration to 5 molar, or about 25% by weight, the resulting beads were consistently water white and free from cloudiness. In a modification of these tests, the polymerization was conducted for 7 hours at 90° C. using distilled water, followed by 90 minutes treatment in sodium chloride brine at 135° C. Cloudy beads were noted when the sodium chloride concentration was 1 molar (5% by weight) or 1.7 molar (10% by weight). However, clear beads were produced when the sodium chloride concentration was 5 molar (25% by weight). By a series of tests it is established that the inorganic solute should be present in a concentration which is within the range from about 2.5 to 6 molar, corresponding to from about 15 to 28% by weight if sodium chloride is the solute.

Various modifications of the invention are possible without departing from the scope of the appended claims.

The invention claimed is:

1. The method for production of reflector polystyrene beads from monomeric styrene which includes the steps of: preparing an aqueous dispersion of monomeric styrene, a polymerization catalyst, and submicron particles of an insoluble inorganic nucleating component; polymerizing the styrene to a dispersion of polystyrene beads by maintaining and agitating said dispersion at an elevated temperature for a period from about 2 to 20 hours; said polymerizing including a terminal treatment at a temperature within the range from about 110° C. to about 140° C. for from about 1 to about 2 hours while said aqueous dispersion contains an inorganic solute having a concentration within the range from about 2.5 to about 6 molar.

* * * * *